Feb. 20, 1968  R. H. MERRICK  3,369,373
SOLUTION TRANSFER APPARATUS
Filed July 1, 1966
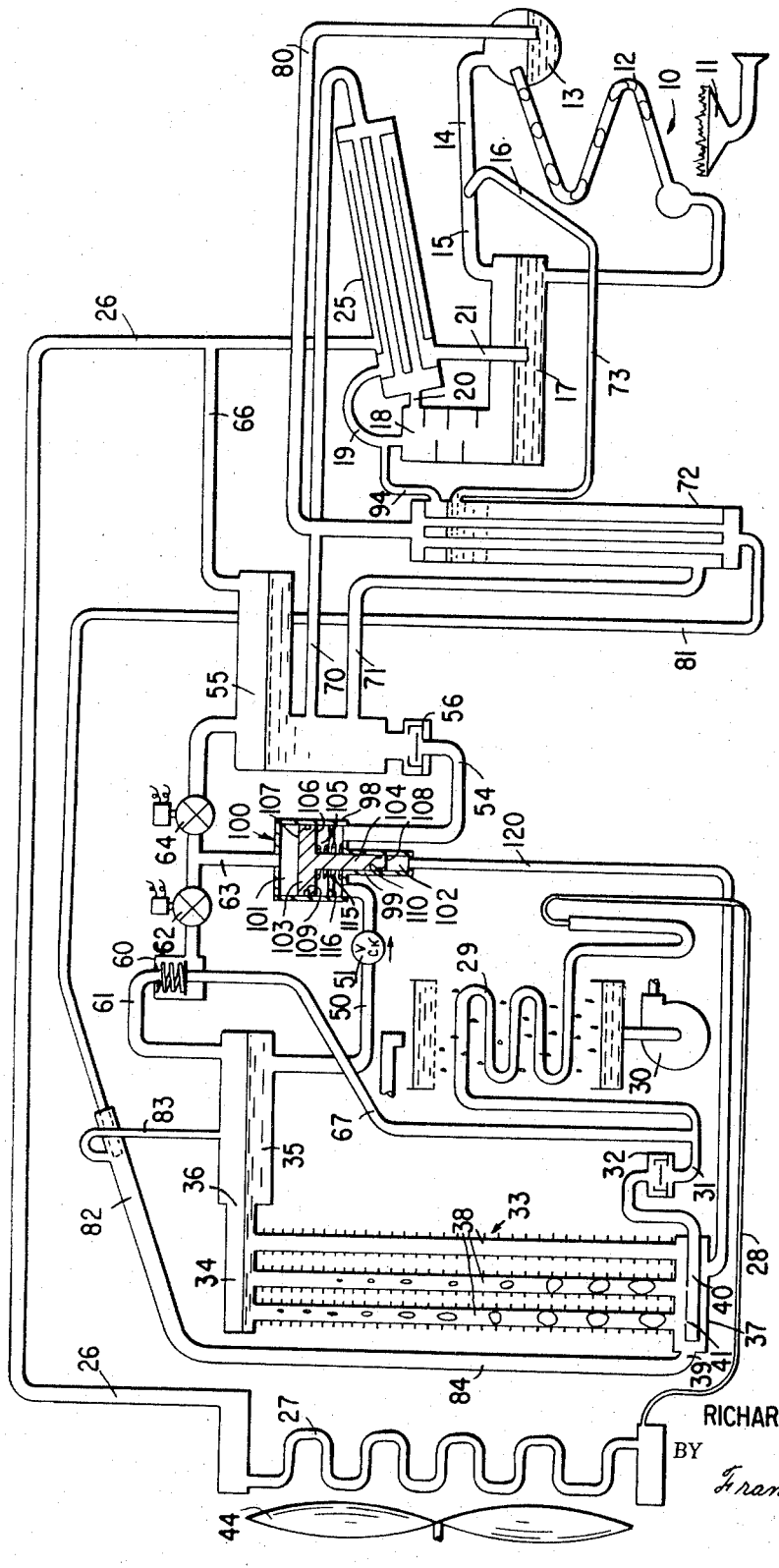
INVENTOR.
RICHARD H. MERRICK.
BY
Frank N. Decker Jr.
ATTORNEY.

United States Patent Office 3,369,373
Patented Feb. 20, 1968

3,369,373
SOLUTION TRANSFER APPARATUS
Richard H. Merrick, Indianapolis, Ind., assignor to Carrier Corporation, Syracuse, N.Y., a corporation of Delaware
Filed July 1, 1966, Ser. No. 562,166
8 Claims. (Cl. 62—141)

ABSTRACT OF THE DISCLOSURE

An absorption refrigeration system having a low pressure side including an evaporator and an absorber, a high pressure side including a generator and a condenser, and a solution transfer apparatus for passing weak absorbent solution from the absorber to the generator. The solution transfer apparatus includes a piston having a large area face exposed to a large area pressure chamber and a small area face exposed to a small area pressure chamber. The large area pressure chamber is alternatively pressurized with high pressure and low pressure vapor and the small area pressure chamber is continuously exposed to low pressure vapor. The space between the two piston faces forms a liquid transfer region for admitting low pressure weak solution from the absorber and discharging it under high pressure to the generator.

---

This invention relates to a solution transfer apparatus for absorption refrigeration systems.

Absorption refrigeration systems include a low pressure side having an absorber and an evaporator, and a high pressure side having a generator and a condenser. The pressure difference between the high and low pressure sides is utilized to pass the strong absorbent solution from the generator to the absorber. However, it is necessary to provide some type of transfer mechanism to return the weakened absorbent solution from the relatively low pressure absorber back to the relatively high pressure generator. In order to avoid the necessity of employing a high head solution pump, various trap cycles have been devised. For example, Merrick's Patent 3,140,589, granted July 14, 1964, shows an example of a trap which is filled from the absorber from gravity flow after which the liquid in the trap is exposed to the high pressure side of the system, and drains from the trap by gravity to a generator reservoir. While such systems are highly satisfactory in operation, they possess the disadvantage of requiring a vertical height difference between the absorber and the trap, and between the trap and the generator in order to permit gravity drainage to transfer the absorbent solution. Consequently, the necessity of providing a sufficient vertical height for proper trap drainage imposes a limitation on the minimum over-all height of the absorption refrigeration machine.

It is an object of this invention to provide an absorption refrigeration system having an improved solution transfer device.

It is a further object of this invention to provide an absorption refrigeration system having a solution transfer device which does not depend entirely upon the vertical height of the machine for transfer of solution from the low pressure side of the system to the high pressure side thereof.

It is a still further object of this invention to provide an absorption refrigeration machine which may have relatively low vertical height.

The features of this invention are achieved in an absorption refrigeration system comprising an absorber, an evaporator, a condenser, a generator, and a solution transfer vessel having a suitably designed piston arrangement disposed therein. The solution transfer vessel has a large cross-sectional area portion and a small cross-sectional portion. A piston having relatively large area face is disposed in the relatively large cross-sectional portion of the vessel to form a large area pressure chamber adjacent the large area face. Another piston, having relatively small area face is disposed in the relatively small cross-sectional portion of the vessel to form a small area pressure chamber adjacent the small area face. The pistons are connected together so that they move as a unit, and the region between the pistons forms a fluid transfer region. The small area pressure chamber is exposed to a low fluid pressure region such as the absorber or the evaporator. The large area pressure chamber is arranged to be alternately exposed to a high pressure fluid region or a low pressure fluid region. Passage means are provided to discharge solution from the absorber into the fluid transfer region of the vessel between the pistons, and means are provided to connect the fluid transfer region of the vessel with the generator.

In operation, when the large area pressure chamber is exposed to a relatively low pressure region, the fluid transfer region is filled with absorbent solution from the absorber. Thereafter, the relatively large area pressure chamber is exposed to a relatively high pressure region. Since it is necessary for the force produced by high pressure acting on the large area face of the piston to be balanced by the forces produced by the relatively low pressure acting on the small area face of the piston, and the force produced by the pressure in the fluid transfer region acting on the difference in areas between the pistons, a greater pressure will exist in the fluid transfer region than that which acts on the large area face of the piston. This high pressure in the fluid transfer region causes fluid to be expelled from the fluid transfer region to the generator.

The fluid transfer device described is capable of transferring solution from the absorber to the generator without requiring a vertical height difference between the generator and the fluid transfer device. Accordingly, the over-all height of the absorption refrigeration system can be reduced, resulting in a more aesthetic appearance and a smaller exterior housing.

These and other features of the invention will become more readily apparent by reference to the following specification and attached drawing wherein the figure schematically shows an absorption refrigeration system having a solution transfer device in accordance with this invention.

Referring particularly to the drawing, there is provided a generator section 10 having a heat source 11, such as a gas-fired burner. Absorbent solution having refrigerant absorbed or dissolved therein is supplied to the generator section and flows through generator tubes 12, which are heated by burner 11. Heating of the solution causes the refrigerant to be vaporized or boiled out of the absorbent solution. The resulting mixture of vaporized refrigerant and hot absorbent solution is passed into separation chamber 13.

A suitable absorbent for a refrigeration system of the type herein described is water, and a suitable refrigerant is ammonia. As used in this description, the absorbent solution which is collected in separation chamber 13 may be thought of as being a relatively strong solution because the solution is strong in absorbing power. Conversely, the absorbent solution passed to the generator may be thought of as being a relatively weak solution because it has a substantial quantity of refrigerant absorbed therein and the solution is therefore weak in absorbing power.

Some absorbent vapor is carried into vapor pasage 14 along with the refrigerant vapor which has been distilled from the weak absorbent solution passed into the generator section. This mixture of absorbent and refrigerant vapor passes through a pre-analyzer section or passage 15 wherein it flows concurrently with weak solution passed into the pre-analyzer section from a weak solution line 16. The resulting gas and liquid contact in the pre-analyzer section gives rise to a mass and heat transfer effect by which some of the absorbent vapor, which is relatively less volatile than the refrigerant vapor and therefore is more easily condensed, is condensed, thereby purifying the refrigerant vapor.

The refrigerant vapor is then passed along with the condensed absorbent solution into generator reservoir 17, which contains a quantity of absorbent solution in the bottom thereof. The refrigerant vapor passes over the top of the absorbent solution in generator reservoir 17 and up through analyzer section 18. Weak solution passes from a weak solution pasage 20 over a series of plates or other suitable analyzer packing material in contact with the refrigerant vapor. A mass and heat transfer again takes place in analyzer section 18 to further purify the refrigerant vapor by condensing the relatively less volatile absorbent vapor.

The purified refrigerant vapor is then passed from the analyzer section through vapor passage 19 into rectifier section 25. Rectifier section 25 comprises a heat exchanger wherein relatively cool weak solution is passed through the heat exchanger and out weak solution passage 20 in heat exchange relation with the refrigerant vapor. The cool weak solution therefore condenses further absorbent vapor from the refrigerant vapor and the condensed absorbent solution is passed through a drain passage 21 in the heat exchanger to generator reservoir 17.

The thus highly purified refrigerant vapor is then passed through vapor passage 26 into condenser section 27 of the absorption refrigeration system. Air or other suitable ambient cooling fluid is passed over the exterior of the heat exchange tubes which form condenser section 27 to cool and condense the refrigerant vapor passed thereto.

The condensed refrigerant liquid passes through a restriction device 28, such as a capillary tube, and into the coil of a chiller section 29. Water or other heat exchange fluid to be cooled is passed over the exterior of the coil in chiller section 29 and heat is extracted from the heat exchange fluid which is then passed by pump 30 to a suitable location to provide the desired refrigeration effect in the region to be refrigerated or air conditioned. The heat extracted from the heat exchange fluid is absorbed by the refrigerant liquid causing the refrigerant to again vaporize in the coil of chiller section 29.

The vaporized refrigerant is then passed through passage 31 having a check valve 32 therein to absorber section 33. Absorber section 33 comprises an upper header 34 having an outlet passage 36 for discharging weak absorbent solution into inlet tank 35. Absorber section 33 is also provided with a lower header 37 and a plurality of absorber tubes or passages, generally designated 38, having open ends communicating with the upper and lower headers. Absorber tubes 38 permit the flow of absorbent solution between upper and lower headers 34 and 37.

Preferably, absorber tubes 38 are spaced from one another and provided with suitable fins so that air or other ambient cooling fluid may be passed over the absorber tubes to cool the absorbent solution therein. A single fan 44 may be used to pass air over absorber tubes 38 and the heat exchange coil or tubes in condenser section 27, if desired.

A refrigerant vapor inlet distributor 40 is provided in lower header 37 and is connected to refrigerant vapor line 31, as shown in the drawing, to admit refrigerant vapor into the open ends of certain predetermined absorber tubes 38 through orifices 41 in the distributor to provide a controlled circulation pattern of absorbent solution in absorber 33.

The weak absorbent solution having dissolved therein considerable refrigerant vapor is passed through outlet 36 of absorber section 33 into inlet tank 35. From inlet tank 35, the weak solution flows through passage 50, solution check valve 51 into solution transfer apparatus 100. Weak solution flows from solution transfer apparatus 100 through outlet passage 54 and check valve 56 into generator outlet tank 55, as will subsequently be described.

From outlet tank 55, the weak solution is divided into two portions. The first portion of the weak solution flows through passage 70 through the interior of rectifier 25, passage 20 and analyzer 18 into generator reservoir 17, thereby condensing absorbent vapor in the rectifier and analyzer as previously described.

The other portion of the weak solution is passed from outlet tank 55 through passage 71 into heat exchanger 72 where it is warmed. After passing through the heat exchanger, the warmed weak solution passes through passage 73 into pre-analyzer section 15, where it initially condenses some absorbent vapor passing through the pre-analyzer section from generator section 10 to generator reservoir 17, as previously described.

A low pressure valve 62 is provided to expose solution transfer apparatus 100 through passage 63, blow-down valve 60, and pressure equalizer line 61 to the low vapor pressure in the inlet tank when valve 62 is open. Under these circumstances, high pressure valve 64 in pressure equalizer line 65 leading from outlet tank 55 is closed. High pressure valve 64 is provided to expose solution transfer apparatus 100 to the high side refrigerant vapor pressure in outlet tank 55 which is pressurized through refrigerant vapor line 66 to substantially generator pressure. A suitable control mechanism is provided to automatically open low pressure valve 62 and close high pressure valve 64 to repeat the solution transfer cycle. Initially upon opening of low pressure valve 62, residual pressure acting on the underside of the diaphragm of blow-down valve 60 opens the blow-down valve so as to vent the pressure in the solution transfer apparatus through line 67 to vapor distributor 40 in the bottom of absorber section 33.

Low pressure valve 62 and high pressure valve 64 are preferably of the electrical solenoid actuated type, although it will be appreciated that any type of valve control mechanism may be utilized by providing an appropriate control circuit such as shown in my United States Patent No. 3,140,589, granted July 14, 1964.

The strong solution which results from the distillation of refrigerant vapor from the weak solution in the generator is collected in separator 13 and passes through passage 80 through the interior of heat exchanger 72, where the hot strong solution is cooled by heat exchange with the relatively cool weak solution passing through line 71, as previously explained. From heat exchanger 72, the strong solution passes through line 81 into the subcooled absorber section 82 and passage 84 to inlet 39 in lower header 37 of absorber section 33. A vent line 83 is provided between vapor space at the top of inlet tank 35 and subcooled absorber section 82 to induce unabsorbed refrigerant vapor in the top of the inlet tank into the cooled strong solution for better cycle efficiency, as more completely described in Patent No. 3,038,316, granted June 12, 1962.

A solution transfer apparatus in accordance with a preferred embodiment of this invention may comprise a solution transfer vessel 100 having a large cross-sectional area portion 98, and a small cross-sectional portion 99. A large area piston 103 is disposed in the large cross-sectional portion 98 of the vessel 100; a small area piston 104 is disposed in the small cross-sectional area portion 99 of vessel 100.

The pistons are preferably integral or are otherwise rigidly secured to each other so that they move with each other. The region between the pistons forms a fluid transfer region 105. Large area piston 103 has a large area face 107 forming a large area pressure chamber 101 in large cross-sectional area portion 101, and small area piston 104 has a small area face 108 forming a small area pressure chamber 102 in small cross-sectional area portion 102.

Suitable means is employed to seal the edges of pistons 103 and 104 to the adjacent sidewalls of vessel 100. In the embodiment shown in the drawing, an O-ring or other suitable sealing gasket 109 is provided about the edge of large area piston 103, and another O-ring 110 is provided to seal the edge of piston 104 against the sidewalls of vessel 100. Alternately, a pair of rolling diaphragms may be used to seal the edges of the two pistons to the sidewalls of vessel 100. Similarly, pistons 103 and 104 may comprise flexible diaphragms, bellows, or combinations thereof of differing areas which are secured to one another so as to move with each other. Also, a conventional piston may be used in one chamber with a connected diaphragm or bellows in another chamber, or various other equivalent combinations of piston-like devices may be employed. The edges of the diaphragms may be secured in fluid tight engagement with the walls of the large and small area portions of vessel 100 to provide a fluid tight assembly. A suitable spring 115 may be provided to bias pistons 103 and 104 toward large area pressure chamber 101. Alternately, the piston assembly may be made so that it floats upwardly due to buoyancy or a liquid head difference as shown in the drawing. A stop ring 116 is preferably provided to limit downward movement of the pistons. Also, chamber 100 may be operated upside down from the position shown in the drawing and the spring eliminated. Bellows and diaphragms are all called "pistons" as used herein because they are functionally equivalent for purposes of this invention.

In operation, low pressure solenoid valve 62 is opened, and high pressure solenoid valve 64 is closed. Consequently, large area pressure chamber 101 is exposed to the relatively low pressure which exists in chamber 36 of absorber 33. Small area pressure chamber 102 is exposed to refrigerant vapor pressure in header 37 of absorber 33 through line 120. Solution is then enabled to flow by gravity from absorber tank 35 through line 50 and check valve 51 into fluid transfer region 105 of vessel 100. Piston 103 is biased upwardly in the chamber by spring 115 so that a substantial quantity of absorbent solution is collected within the fluid transfer region.

After a suitable period of time, low pressure solenoid valve 62 is closed, and high pressure solenoid valve 64 is opened. Consequently, large area pressure chamber portion 101 and large area face 107 of piston 103 are exposed to the relatively high pressure existing in generator reservoir 55 which is at substantially generator pressure. However, small area face 108 of piston 104 is still exposed to the relatively low absorber pressure through line 120. The relatively weak force created by the low pressure acting on small area face 108, and the pressure in fluid transfer region 105 acting on face 106 of piston 103 in fluid transfer region 105 plus any spring force must balance the large force acting on face 107 due to the relatively high pressure acting on the relatively large area face 107. Consequently, the pressure in fluid transfer region 105 necessary to balance the piston must be substantially higher than the pressure in large cross-sectional area 101, because the area of face 106 is essentially equal to the difference in areas of faces 107 and 108. The high pressure produced in fluid transfer region 105 is sufficient to force the absorbent solution through check valve 56 in line 54, and pass the absorbent solution to a suitable location in the generator such as generator reservoir 55 on the high pressure side of the system.

After a suitable period of time when piston 103 has moved downwardly in vessel 100, and absorbent solution has been expelled from fluid transfer region 105, high pressure solenoid valve 64 is closed and low pressure solenoid valve 62 is opened to repeat the fluid transfer cycle.

Because the fluid in fluid transfer region 105 is transferred under a relatively high pressure, it will be apparent that it is not necessary to provide a difference in vertical height between generator 10 or generator reservoir 17 and the solution transfer vessel 100. Accordingly, the vertical height of the absorption refrigeration system may be reduced because one of the gravity head factors is eliminated.

Various other embodiments of this invention may be envisioned which fall within the scope of the following claims.

I claim:
1. An absorption refrigeration system comprising:
   (A) a low pressure side including
      (1) an evaporator for evaporating refrigerant to produce cooling,
      (2) an absorber for absorbing refrigerant vapor formed in said evaporator into an absorbent solution;
   (B) a high pressure side including
      (1) a generator for heating weak absorbent solution to vaporize refrigerant and concentrate said absorbent solution,
      (2) a condenser to liquefy refrigerant vapor formed in said generator; and
   (C) a solution transfer apparatus for passing absorbent solution from said low pressure side of said system to said high pressure side of said system, said solution transfer apparatus comprising:
      (1) a transfer vessel leaving a relatively large cross-sectional area portion and a relatively small cross-sectional area portion,
      (2) a first piston having a relatively large area face disposed in said large cross-sectional area portion, thereby forming a large area pressure chamber adjacent said large area face of said piston,
      (3) a second piston having a relatively small area face disposed in said small cross-sectional area portion, thereby forming a small area pressure chamber adjacent said small area face of said piston, said first and second pistons being connected to move with each other and forming a liquid transfer region in said transfer vessel between the faces of said pistons,
      (4) passage means continuously connecting the relatively small area pressure chamber to a relatively low fluid pressure region to continuously expose the small area face of said second piston to a low vapor pressure at all times during operation of said system,
      (5) passage means to admit absorbent solution from the low pressure side of said system into the liquid transfer region between said piston faces,
      (6) passage means to discharge absorbent solution from said liquid transfer region to said high pressure side of said system,
      (7) passage and valve means alternately to connect said large area pressure chamber with a low pressure vapor region to fill said liquid transfer region with absorbent solution from said low pressure side of said system, and thereafter to connect said large area pressure chamber with a high pressure vapor region to expel absorbent solution from said solution transfer region to said high pressure side of said system under a pressure greater than that existing in said large area pressure chamber, due to the difference in areas of said pistons and the difference in pressures acting thereon.

2. An absorption refrigeration system as defined in claim 1, including spring means biasing said large area face of said piston toward said large cross-sectional area portion of said solution transfer vessel to increase the volume of said fluid transfer region when said large area pressure chamber is exposed to said relatively low fluid pressure.

3. An absorption refrigeration system as defined in claim 1, wherein said small area pressure chamber is connected with a region containing refrigerant vapor formed in said evaporator.

4. An absorption refrigeration system as defined in claim 1, wherein said large area pressure chamber is alternately connected with a vapor space in said absorber, and a vapor space in said generator.

5. An absorption refrigeration system as defined in claim 1, including stop means to limit the movement of said pistons.

6. An absorption refrigeration system as defined in claim 1, including sealing means to seal said pistons to the sides of said solution transfer vessel while permitting movement of said pistons therein.

7. An absorption refrigeration system as defined in claim 1, wherein said pistons are integrally connected with each other.

8. An absorption refrigeration system as defined in claim 1, including check valves in the line for admitting absorbent solution to said fluid transfer region, and the line for discharging absorbent solution from said fluid transfer region.

References Cited

UNITED STATES PATENTS

| | | | |
|---|---|---|---|
| 3,046,756 | 7/1962 | Whitlow et al. | 62—467 X |
| 2,929,222 | 3/1960 | Lang | 62—487 |
| 3,140,589 | 7/1964 | Merrick | 62—107 |
| 3,271,976 | 9/1966 | Palmatier | 62—487 |
| 3,293,881 | 12/1966 | Walker | 62—487 |

LLOYD L. KING, *Primary Examiner.*